(12) United States Patent
Goldhahn et al.

(10) Patent No.: US 12,530,595 B2
(45) Date of Patent: Jan. 20, 2026

(54) IDENTIFICATION OF A CHARACTERISTIC OF A PHYSICAL SYSTEM BASED ON COLLABORATIVE SENSOR NETWORKS

(71) Applicant: Lawrence Livermore National Security, LLC, Livermore, CA (US)

(72) Inventors: Ryan Alan Goldhahn, Livermore, CA (US); Priyadip Ray, Livermore, CA (US); Braden C. Soper, Livermore, CA (US); Hao Chen, Boise, ID (US); Deepak Rajan, Livermore, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 495 days.

(21) Appl. No.: 17/165,714

(22) Filed: Feb. 2, 2021

(65) Prior Publication Data

US 2021/0241124 A1  Aug. 5, 2021

Related U.S. Application Data

(60) Provisional application No. 62/969,352, filed on Feb. 3, 2020.

(51) Int. Cl.
*G06N 3/084* (2023.01)
*G06N 3/044* (2023.01)
(Continued)

(52) U.S. Cl.
CPC ............. *G06N 3/126* (2013.01); *G06N 3/086* (2013.01); *G06N 7/01* (2023.01)

(58) Field of Classification Search
CPC ........... G06N 3/126; G06N 3/086; G06N 7/01
See application file for complete search history.

(56) References Cited

U.S. PATENT DOCUMENTS

| | | | |
|---|---|---|---|
| 2009/0125274 A1* | 5/2009 | Waldock .............. | G05B 13/024 702/181 |
| 2019/0148246 A1* | 5/2019 | Zhan ...................... | G06N 3/045 438/14 |

(Continued)

OTHER PUBLICATIONS

Ahn, S. et al., "Distributed stochastic gradient mcmc," in International conference on machine learning, 2014, pp. 1044-1052.

(Continued)

*Primary Examiner* — Brandon S Cole
(74) *Attorney, Agent, or Firm* — Perkins Coie LLP (57) ABSTRACT

A node having a sensor and a computing device is provided for identifying a location of a source of a physical process. The node collects via the sensor a measurement of the physical process. The node repeatedly recalculates parameters until termination criterion is satisfied. The node receives parameters of a probability distribution and a gradient from other nodes. The node generates parameters based on the parameters and the gradients received from the other nodes. The node samples from a distribution of source locations based on the generated parameters. The node calculates a gradient derived from the sampled source locations, the generated parameters, and a joint probability of the sampled source locations and the measurement. The node sends to a subset of other nodes the generated parameters and the calculated gradient. When the termination criterion is satisfied, the generated parameters represent the probability distribution of the source location.

14 Claims, 5 Drawing Sheets

(51) Int. Cl.
    *G06N 3/047*      (2023.01)
    *G06N 3/086*      (2023.01)
    *G06N 3/126*      (2023.01)
    *G06N 7/01*      (2023.01)

(56) References Cited

U.S. PATENT DOCUMENTS

| | | | | |
|---|---|---|---|---|
| 2019/0259474 | A1* | 8/2019 | Wang | G16C 60/00 |
| 2020/0110175 | A1* | 4/2020 | Chen | G01S 17/89 |
| 2021/0158028 | A1* | 5/2021 | Wu | G16H 30/20 |

OTHER PUBLICATIONS

Cattivelli, F. S., et al. (2009). Diffusion LMS strategies for distributed estimation. IEEE Transactions on Signal Processing, 58 (3), 1035-1048.

Draxler, R., R., "Forty-eight-hour atmospheric dispersion forecasts at selected locations in the united states," 1981.

Erseghe, T. (2012). A distributed and scalable processing method based upon Admm. IEEE Signal Processing Letters, 19 (9), 563-566.

Ihler, A. T., et al. (2005). Nonparametric belief propagation for self-localization of sensor networks. IEEE Journal on Selected Areas in Communications, 23(4), 809-819.

Neiswanger, C. et al., "Asymptotically exact, embarrassingly parallel mcmc," arXiv preprint arXiv:1311.4780, 2014.

Ranganath, R., et al. "Black Box Variational Inference," Proceedings of the 17th International Conference on Artificial Intelligence and Statistics (AISTATS) 2014, Reykjavik, Iceland. Jmlr: W&Cp vol. 33, pp. 814-822.

Robbins, H., et al., "A stochastic approximation method," The annals of mathematical statistics, pp. 400-407, 1951.

Scott, S. L. et al., "Bayes and big data: The consensus monte carlo algorithm," International Journal of Management Science and Engineering Management, vol. 11, No. 2, 2016.

Welling, M., et al., "Bayesian learning via stochastic gradient langevin dynamics," in Proceedings of the 28th International Conference on Machine Learning (ICML-11), 2011, pp. 681-688.

* cited by examiner

IDENTIFICATION OF A CHARACTERISTIC OF A PHYSICAL SYSTEM BASED ON COLLABORATIVE SENSOR NETWORKS

CROSS-REFERENCE TO RELATED APPLICATION(S)

This application claims the benefit of U.S. Provisional Application No. 62/969,352, filed on Feb. 3, 2020, entitled "IDENTIFICATION OF A CHARACTERISTIC OF A PHYSICAL SYSTEM BASED ON COLLABORATIVE SENSOR NETWORKS," which is hereby incorporated by reference in its entirety.

STATEMENT REGARDING FEDERALLY SPONSORED RESEARCH

The United States government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Decentralized estimation of location by autonomous networks is important in many critical applications such as situational awareness, search and rescue, and disaster management and mitigation. In many of these applications, uncertainty quantification is important for subsequent decision making. The decision to take an action without factoring the uncertainty can lead to disastrous results. For example, if a search and rescue team is sent to a location that is most likely the correct location but only with a probability of 0.25, there is a probability of 0.75 that the team will be going to the wrong location. If the uncertainty was factored in, the decision may be to collect more information before sending the team in hopes of improving the probability that the team will be sent to the correct location initially. As another example, if a predicted source location of a gas plume is mostly likely the correct source location with a probability of 0.51 and another predicted source location (far away from the correct source location) has a probability of 0.49 based on measurements of concentration of the gas, the decision may be to collect more measurements in hopes that the probability of the correct source location will increase.

To identify the source location associated with a physical event or location of a stationary or moving object, a collection of distributed sensors may be employed to collect measurements relating to the physical event such a release of radiation or a gas or relating to LIDAR return signals from a drone. For example, sensors for detecting a certain type of gas may be installed at various locations throughout an industrial park. When a gas release occurs, each sensor collects measurements relating to the concentration of the gas. Sensors downwind from a gas release and closest to the source location of the gas release will detect a concentration of the gas that is higher than that detected by a downwind sensor that is farther away or by a sensor that is upwind from the source location. The source location, however, cannot be determined based only on measurements of single sensor. For example, even if the concentration of the gas that is released is known, a measurement of a sensor may provide some indication of distance to the gas release but not direction of the gas release. However, the wind patterns will affect the concentration measured by the sensor resulting in any distance to or source location based on the measurement to have a high uncertainty.

DETAILED DESCRIPTION

Methods and systems are provided for identifying a characteristic of an event based on measurements relating to the event collected by a network of nodes. In some embodiments, a characteristic identification (CID) system identifies characteristics that may include the source location of the event (e.g., location of release of a gas), concentration of an emission at the source location of the event (e.g., concentration of radiation or release of a chemical in a lake), magnitude of an acoustic or electromagnetic wave generated by the event (e.g., decibels of sound or intensity of light generated by an explosion or gunshot), and so on. An event may refer to the positioning of an object at a location such as the moving of a drone or stationing a drone at a stationary location. Each node may include a sensor, a computing component, and a communication interface. The computing component may include a central processing unit and a memory unit, storing instructions that implement the CID system. Each node may repeatedly perform iterations and receive information from other nodes (e.g., a subset of other nodes) via the communication interface. For each iteration, the CID system performs computations to obtain a closer approximation of a probability distribution (e.g., a probability distribution of the source location). The probability distribution may be represented by a probability distribution description, such as a mean and variance for a Gaussian distribution. The iterations are performed until a termination criterion is satisfied (e.g., number of iterations or approximation accuracy).

In some embodiments, the probability distribution may be fully characterized via a finite number of parameters, such as the mean and standard deviation (e.g., for a Gaussian distribution). However, the CID system may be employed for any valid probability distribution function. The CID system may employ multiple marginal probability distributions for a characteristic. For example, if the characteristic is source location, the CID system may employ a marginal probability distribution for an x-coordinate of the source location and a marginal probability distribution for the y-coordinate of the source location, or a joint probability distribution for the (x, y)-coordinates of the source location.

Upon receiving the probability distribution descriptions and gradients from other nodes, the CID system at a node generates a probability distribution description from the received probability distribution descriptions and gradients. For example, the generated probability distribution description may be based on an average of the received probability distribution descriptions and gradients. The CID system then samples values for the characteristic based on the generated probability distribution description. The CID system calculates a gradient based on the sampled values and a joint probability distribution based on a measurement of the node and the sampled values. The gradient may be calculated based on various algorithms such as a Black Box Variational Inference and an Evidence Lower Bound as described below. The CID system then sends the generated probability distribution description (referred to as variational parameters) and the generated gradient to other nodes. The other nodes may be a randomly selected subset of other nodes.

Figure 1:
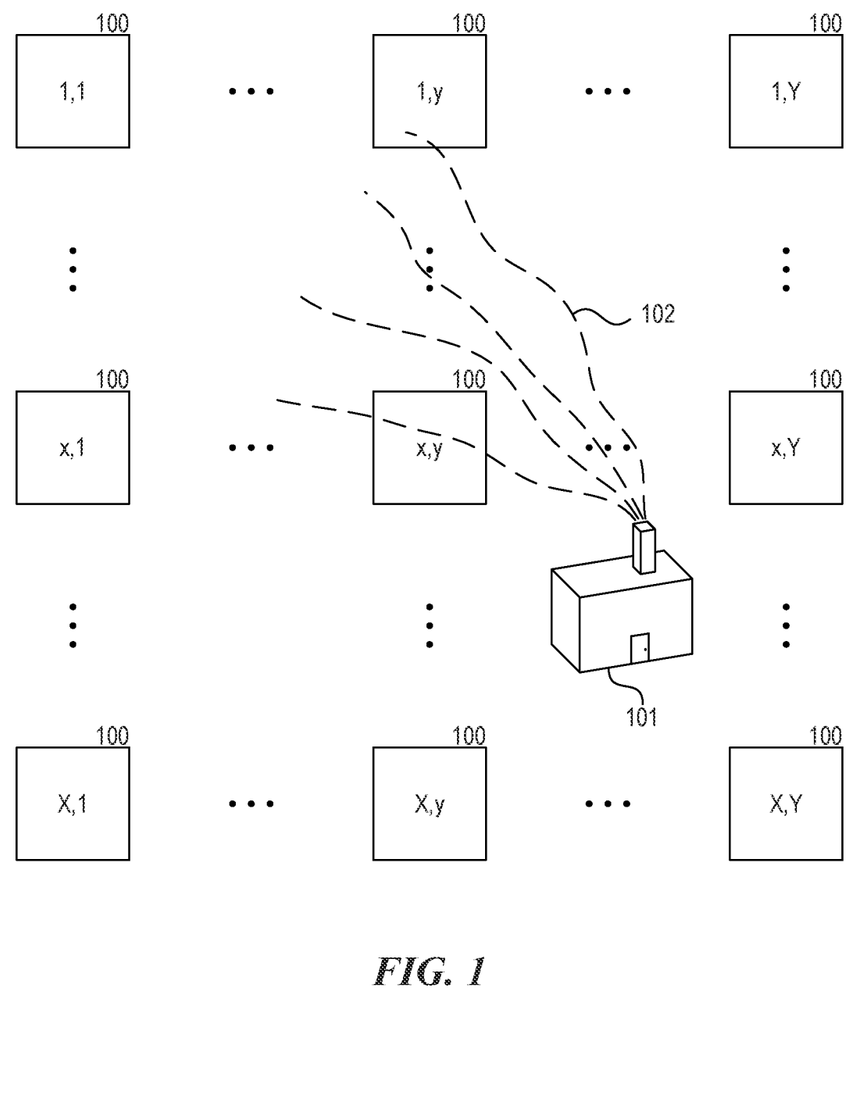
FIG. 1 is a block diagram that illustrates a network of nodes relative to a source of a gas plume.

FIG. 1 is a block diagram that illustrates a network of nodes relative to a source of a gas plume. The nodes 100 are positioned at node locations throughout an area. For example, the nodes may be mounted on towers, attached to buildings, located on the ground, and so on. The nodes may even be located in a building such as a large warehouse or a school. Although the nodes are illustrated as being positioned in a grid, the nodes may be positioned non-uniformly throughout the area. Building 101 represents the source location of the gas plume 102. The gas plume is illustrated as dispersing towards the nodes at the upper left portion of the network. Those nodes collect measurements indicating a concentration of the gas. The measurements of the other nodes may reflect very low or no concentration of gas.

Figure 2:
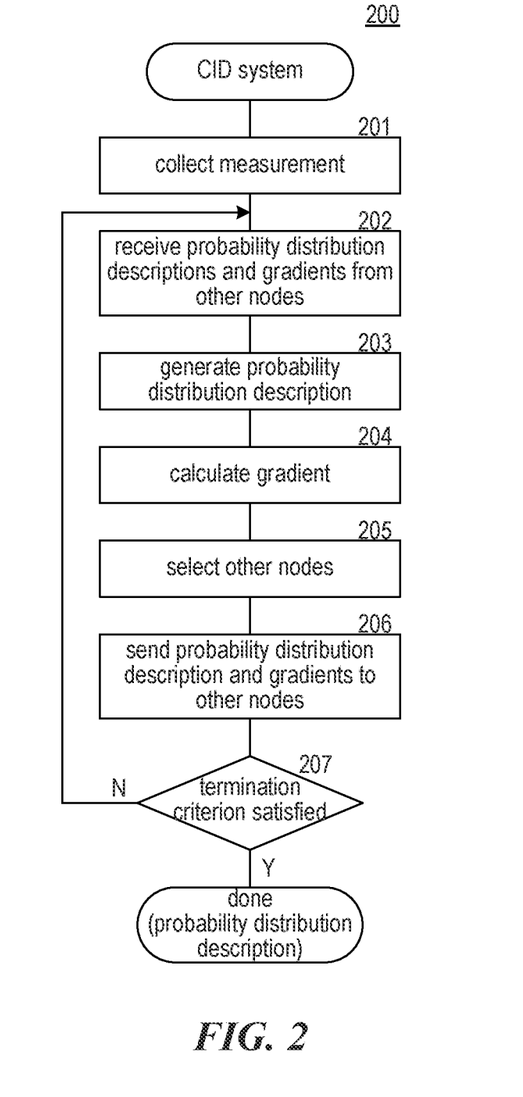
FIG. 2 is a flow diagram that illustrates the overall processing of a characteristic identification (CID) system in some embodiments.

FIG. 2 is a flow diagram that illustrates the overall processing of the CID system in some embodiments. The CID system 200 executes on a computing device of a node. In block 201, the CID system collects a measurement via the sensor. In blocks 202-207, the CID system loops updating the probability distribution description for the value of the characteristic until a termination criterion is satisfied. In block 202, the CID system receives a probability distribution description and a gradient from multiple other nodes. In block 203, the CID system generates a probability distribution description based on the received probability distribution descriptions and gradients. For example, the probability distribution description may be based on an average of the received probability distribution descriptions and gradients. In block 204, the CID system calculates a gradient based on a sampling of the probability distribution represented by the generated probability distribution description. In block 205, the CID system selects a subset of the other nodes. For example, the CID system may select a fixed percentage of the other nodes and may randomly select a different set of other nodes at each iteration. In block 206, the CID system sends the generated probability distribution description and the calculated gradient to each of the selected nodes. In decision block 207, if the termination criterion is satisfied, then the CID system completes indicating the probability distribution description that represents the probability distribution for the value of the characteristic, else the CID system loops to block 202 to perform the next iteration In some embodiments, the CID system employs a Black Box Variational Inference (BBVI) algorithm and an Evidence Lower Bound (ELBO) to generate the probability distribution descriptions. (See, Ranganath, R., Gerrish, S., and Blei, D. M., "Black Box Variational Inference," Proc. 17$^{th}$ Int. Conf. on Artificial Intelligence and Statistics, Reykjavik, Iceland, 2014, which is hereby incorporated by reference.) The probability distribution p(θ|D) for a value given measurements may be represented based on a model of measurements of the output of an event over time and space. For example, the model for a gas plume may be based on a model of dispersion of the gas (as described below). The probability distribution may be represented by the following equation:

$$p(\theta|D) = \frac{p(\theta)p(D|\theta)}{p(D)} = \frac{p(\theta)\prod_{i=1}^{N}p(d_i|\theta)}{\int p(\theta)p(D|\theta)d\theta}$$

where $D=\{d_i | i \in [1, N]\}$ and $d_i$ represents a measurement of node i.

The CID system employs BBVI to approximate p(θ|D)) as the variational distribution q(θ;λ) where D represents the measurements, θ represents the value of the characteristic, and λ represents the variational parameters (e.g., mean and variance for a Gaussian probability distribution). The gradient of the ELBO may be represented by the following equation:

$$\nabla_\lambda \mathcal{L}(q) \approx \frac{1}{n}\sum_{k=1}^{n}\nabla_\lambda \log q(\theta_k; \lambda)(\log p(\theta_k, D) - \log q(\theta_k; \lambda)), \quad (1)$$

were $\mathcal{L}(q)$ represents the ELBO and $\theta_k$ represents a sample from q. The ELBO may be represented by the following equation:

$$\begin{aligned}
\mathcal{L}(q(\theta; \lambda)) &= \mathbb{E}_q[\log p(\theta, D)] - \mathbb{E}_q[\log q(\theta; \lambda)] \\
&= \mathbb{E}_q[\log p(D|\theta)p(\theta)] - \mathbb{E}_q[\log q(\theta; \lambda)] \\
&= \mathbb{E}_q[\log p(D|\theta)] + \mathbb{E}_q\left[\log \frac{p(\theta)}{q(\theta; \lambda)}\right] \\
&= \sum_{i=1}^{N}\mathbb{E}_q[\log p(d_i|\theta)] + \mathbb{E}_q\left[\log \frac{p(\theta)}{q(\theta; \lambda)}\right] \\
&= \frac{N}{N}\sum_{i=1}^{N}\mathbb{E}_q[\log p(d_i|\theta)] + \frac{N}{N}\mathbb{E}_q\left[\log \frac{p(\theta)}{q(\theta; \lambda)}\right] \\
&= \frac{1}{N}\sum_{i=1}^{N}\mathbb{E}_q\left[\frac{\log p(d_i|\theta)^N p(\theta)}{q(\theta; \lambda)}\right] = \frac{1}{N}\sum_{i=1}^{N}\mathcal{L}_i(q(\theta; \lambda))
\end{aligned}$$

where $$q(\theta;\lambda)=q(\theta;\mu,\Sigma)=\mathcal{N}(\mu,\Sigma).$$

During each iteration, the CID system updates the variational parameters as illustrated by the following equation:

$$\lambda_t = \lambda_{t-1} + \epsilon_t(\nabla_{\lambda_{t-1}}\mathcal{L}(q)),$$

where $\epsilon_t$ represents a learning rate schedule that follows the Robbins-Monro conditions as represented by the following:

$$\sum_{t=1}^{\infty}\epsilon_t = \infty, \sum_{t=1}^{\infty}\epsilon_t^2 = \infty. \quad (2)$$

Since the CID system employs variational inference in a network of nodes, the CID system generates $\lambda_{t-1}$ and $\nabla_{\lambda_{t-1}}\mathcal{L}(q)$ based on probability distribution descriptions and gradients received from other nodes.

The CID system may employ an algorithm for generating a probability distribution description for a probability distribution of values of the characteristic as represented by the following pseudocode:

1: Input: Sensor network G=(V,E) with N nodes, subsample parameter α, number of samples n, number of iterations T
2:
3: Randomly initialize $\lambda_0^i = (\mu_0^i, L_0^i)$ for each $i \in V$
4: for t=1 to T do
5: Let $\in_t$ be a step size that obeys conditions (2)
6: for each sensor $i \in V$ do in parallel
7: Collect messages from other sensors
8: Let $n_t^i = 0$, $\lambda^{sum} = 0$, $g^{sum} = 0$
9: for each incoming message (j, $\lambda^j$, $g^j$) do
10: $\lambda^{sum} = \lambda^{sum} + \lambda^j$
11: $g^{sum} = g^{sum} + g^j$
12: $n_t^i = n_t^i + 1$
13: Perform local update
14:

$$\lambda_t^i = \frac{1}{n_t^i}\lambda^{sum} + \in_t \left(\frac{N}{n_t^i}g^{sum}\right)$$

15: Compute new gradient and send results to other sensors
16: for k=1 to n do
17: Sample $$\theta_k \sim q(\theta_k; \lambda_t^i)$$

$$\nabla_{\lambda_t^i} \mathcal{L}(q) \approx \frac{1}{n}\sum_{i=k}^{N} \nabla_{\lambda_t^i} \log q(\theta_k; \lambda_t^i)(\log p(\theta_k, d_i) - \log q(\theta_k; \lambda_t^i))$$

Let $m = \left(i, \lambda_t^i, \nabla_{\lambda_t^i} \mathcal{L}(q)\right)$

18:
19:
20: Let $S_t^i \subset V$ be a random subset of $[\alpha N]$ sensors
21: for $j \in S_t^i$ do
22: Send message m to node j
23: return $\{\lambda_T^i\}_{i=1}^{N}$ where i represents a node, j represents another node, t represents iteration count, and n represents the number of samples of the probability distribution.

In some embodiments, a node may "censor" the data that it sends to other nodes when the data is determined to be not particularly informative. During each iteration, a node can estimate how informative its gradient and measurement are to other nodes. For example, a node may estimate informativeness based on the magnitude of the gradient or an estimate of the signal-to-noise ratio of the measurement. If the magnitude is small or the estimate is low, the gradient and measurement may not be informative. When determined to be not informative, the node suppresses the sending of the probability distribution description and gradient to other nodes thus censoring its data.

When a node randomly selects other nodes to send its message, some of selected nodes may not to be within direct communication range of the selecting node. In such a case, a message sent to a selected node may be routed through intermediate nodes to that selected node. Rather than merely forwarding the message, each intermediate node may add its own probability distribution description and gradient to the data message that is forwarded. By adding to the data message, the selected node that receives the message increases the number of nodes from which it has received data without effectively increasing the communication overhead. The selected node that receives the data of the selecting sensor along with the data of the intermediate sensors will be able to generate a gradient based on the increased amount of data. Also, a message may be delayed in being delivered to a node. In such a case, the receiving node can use the data of the message during its next iteration. Alternatively, each message may be timestamped, and a receiving node can determine whether to discard the message based on whether the timestamp indicates that the message is stale.

he CID system may select the number of nodes based on the available communication bandwidth. If less bandwidth is available, a smaller number of nodes can be selected. The CID system may also reduce the communication overhead by quantizing the probability distribution descriptions and the gradients so that fewer bits are sent—albeit with some information loss. The level of quantization may be based on simulations to evaluate the effects of levels of the quantization on the effectiveness of the source localization.

The CID system may filter out data messages that appear to contain data that is defective. A node may collect incorrect measurements that have very little or no relation to correct measurements. Such incorrect measurements may be a result of a noisy environment or a faulty sensor. In addition, an adversary may manipulate the data prior to being sent from node or while in route to node. To account for such defective data, the CID system may take into account the potential presence of defective data received from other nodes to improve its accuracy. For example, a node may take an average of the data that it receives and filter out data that appears to be defective (e.g., too far from the average) or may use a weighted average of all the data that is receives.

In some embodiments, the CID system may employ a Distributed Markov chain Monte Carlo ("MCMC") algorithm, rather than an BBVI algorithm and ELBO, to generate the probability distribution. This embodiment of the CID system is referred to as a CID-MC system. During each iteration, the CID-MC system at a node calculates a gradient of the log of its prior probability distribution and a gradient of the loglikelihood of its measurement at the last value of the Markov chain. The node sends the gradient loglikelihood and sample values to other nodes. The node also receives from other nodes the gradients and sample values that each node calculated. The node then calculates an average of the gradients of the log of the prior probability distribution of the nodes and an average of the sample values. The node then samples a new value based on its calculated gradient of the log of its prior probability distribution, average sample values, and average gradient of the log likelihood. The node then adds the sample point to the Markov chain and performs the next iteration.

The CID-MC system represents the gradient of the loglikelihood for a posterior sample $\theta_t^j$ as represented by the following equation:

$$g_t^j = \nabla \log p(x_j | \theta_t^j)$$

The gradients may be calculated using various algorithms, such as a Langevin dynamics algorithm. During each iteration, the CID-MC system updates its estimate of $\theta_t^j$ as illustrated by the following equation:

$$\theta_{t+1}^j = \frac{1}{|S_t^i|}\sum_{i:j \in S_t^i} \theta_t^i + \in_t \left(\nabla \log p(\theta_t^j) + \frac{1}{\alpha}\sum_{i:j \in S_t^i} g_t^i\right) + \eta_t$$

The CID-MC system at each iteration updates its estimate of the gradient of the loglikelihood based on the following equation:

$$\frac{1}{\alpha} \sum_{k: j \in S_t^i} \nabla \log p(x_j | \theta_t^j)$$

The CID-MC system may employ an algorithm for generating a probability distribution of the characteristic as represented by the following pseudocode:

1: Set a prior p(θ) for the unknow parameter vector θ;
2: Collect measurement $x^j$;
3: Initialize Markov chain at $\theta_0^j$, from the prior p(θ);
4: Set i = 0;
5: for t = 1 to T do
6:    Calculate the gradient of the log of the prior p(θ) at $\theta_i^j$;
7:    Calculate the gradient of the loglikelihood ($g_t^j$) of $x^j$ evaluated at $\theta_i^j$;
8:    Select a random subset of sensors $S_t^j$;
9:    Send gradient of the loglikelihood ($g_t^j$) and $\theta_i^j$ to sensors $S_t^j$;
10:    Receive gradients of the loglikelihoods ($g_t^i$) and $\theta_i^i$ from a random subset of sensors $S_t^{\prime i}$;
11:    Calculate the average of received gradient loglikelihoods and current samples;
12:    Sample a new point $\theta_{i+1}^j$ based on the gradient of the log of the prior probability distribution, average of the received gradient loglikelihoods, average of current samples, and random noise;
13:    Add new point $\theta_{i+1}^j$ to the Markov chain;
14:    Set i = i + 1;
15: Approximate $p(x_i | \theta_i)$ as histogram$(\theta_{1:i}^j)$ In the context of event resulting in the release of a gas plume, the goal is to identify the source location θ=($\theta_x, \theta_y$) of the event given the location $\ell_i$ of the node i relative to the node and given a measurement $d_i$ as represented by the following equation:

$$d_i = f(\theta, \ell_i) + \delta_i,$$

where $\delta \sim \mathcal{N}(0, \sigma^2)$. The equation may also be represented as:

$$d_i | \sim \mathcal{N}(f(\theta, \ell_i), \sigma^2).$$

The function $f$ may be represented by a Gaussian dispersion model as represented by the following equation:

$$f(\theta, \ell_i) = \frac{Q \exp\left(-\frac{(\ell_{iy} - \theta_y)^2}{2\left(\frac{\alpha(\ell_{ix} - \theta_x)}{\sqrt{1 + \alpha(\ell_{ix} - \theta_x)}}\right)^2}\right) \exp\left(-\frac{h^2}{2(b(\ell_{ix} - \theta_x))^2}\right)}{\pi u \left(\frac{\alpha(\ell_{ix} - \theta_x)}{\sqrt{1 + \alpha(\ell_{ix} - \theta_x)}}\right)(b(\ell_{ix} - \theta_x))},$$

where the parameters Q, u, a, b, and c are set based on the desired modeling of the gas plume.

Although the CID system is described primarily in the context of stationary nodes, the CID system may be used with moving nodes such as nodes that are part of autonomous vehicles ("AVs") that are autonomously driven. The AVs may include unmanned aerial vehicles ("UAVs"), unmanned ground vehicles ("UGVs"), unmanned underwater vehicles ("UUVs"), and unmanned space vehicles ("USVs"). These vehicles are "unmanned" in the sense that a person does not control the guidance of the vehicle irrespective of whether a person is actually on board the vehicle. For example, UAVs and UGVs may move about a city trying to locate the source of a radiation. UUVs may employ sonar to track a target underwater vehicle and to send data messages. USV may be employed to track objects in space such as space junk and a source location underwater, on land, in air, or in space. In addition, the CID system may be used to track sources that are moving such as a source of radiation on a truck as it move through a city.

Figure 3:
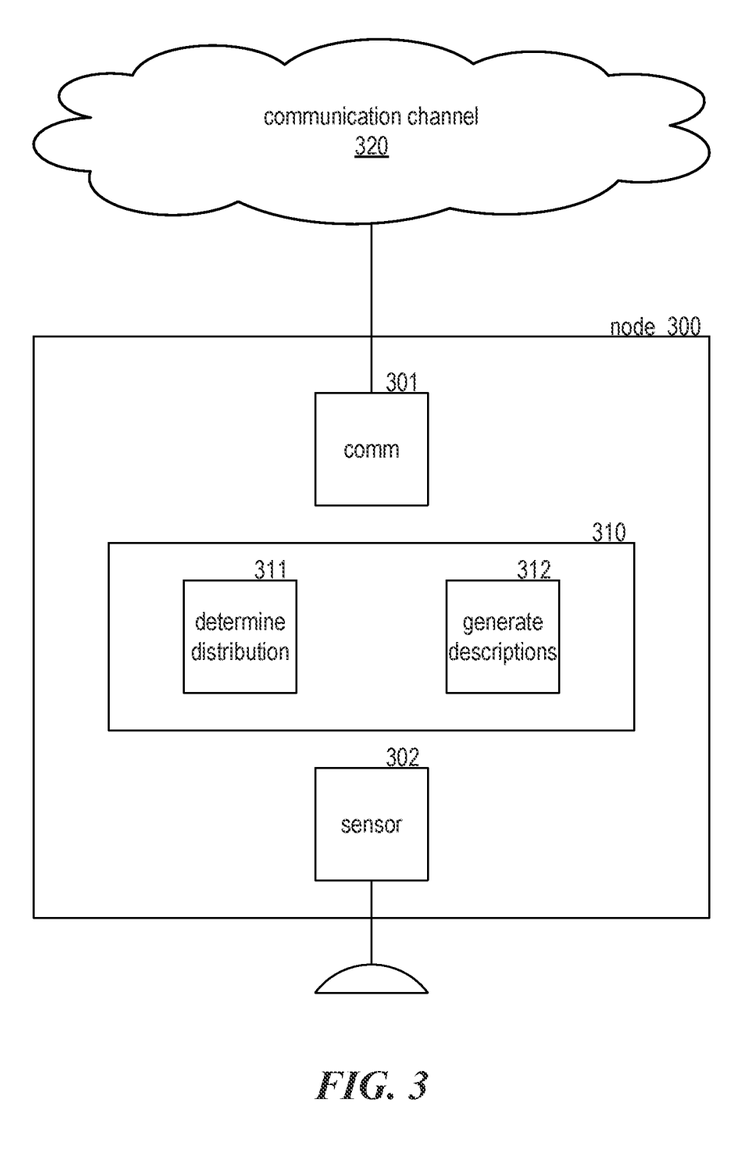
FIG. 3 is a block diagram illustrating components of a node implementing the CID system.

FIG. 3 is a block diagram illustrating components of a node implementing the CID system. The node 300 includes a communication interface 301, a sensor 302, and a computing component 310. The computing component includes a processor and memory that stores instructions of a determine distribution component 311 and a generate description component 312. The node interfaces via the communication interface with communication channel 320. Each node may be adapted to communicate with a subset of other nodes connected via the communication channel. For example, each node may communicate with other nodes in a certain range. The determine distribution component controls the overall processing of the CID system. The determine distribution component invokes the generate description component to generate a new probability distribution description during each iteration.

The computing systems (e.g., network nodes or collections of network nodes) on which the CID system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include high-performance computing systems, cloud-based servers, desktop computers, laptops, tablets, e-readers, personal digital assistants, smartphones, gaming devices, servers, and so on. For example, the simulations and training may be performed using a high-performance computing system, and the classifications may be performed by a tablet. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the CID system. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The CID system may be described in the general context of computer-executable instructions, such as program modules and components, executed by one or more computers, processors, or other devices. Generally, program modules or components include routines, programs, objects, data structures, and so on that perform tasks or implement data types of the CID system. Typically, the functionality of the program modules may be combined or distributed as desired in various examples. Aspects of the CID system may be implemented in hardware using, for example, an application-specific integrated circuit ("ASIC") or field programmable gate array ("FPGA").

Figure 4:
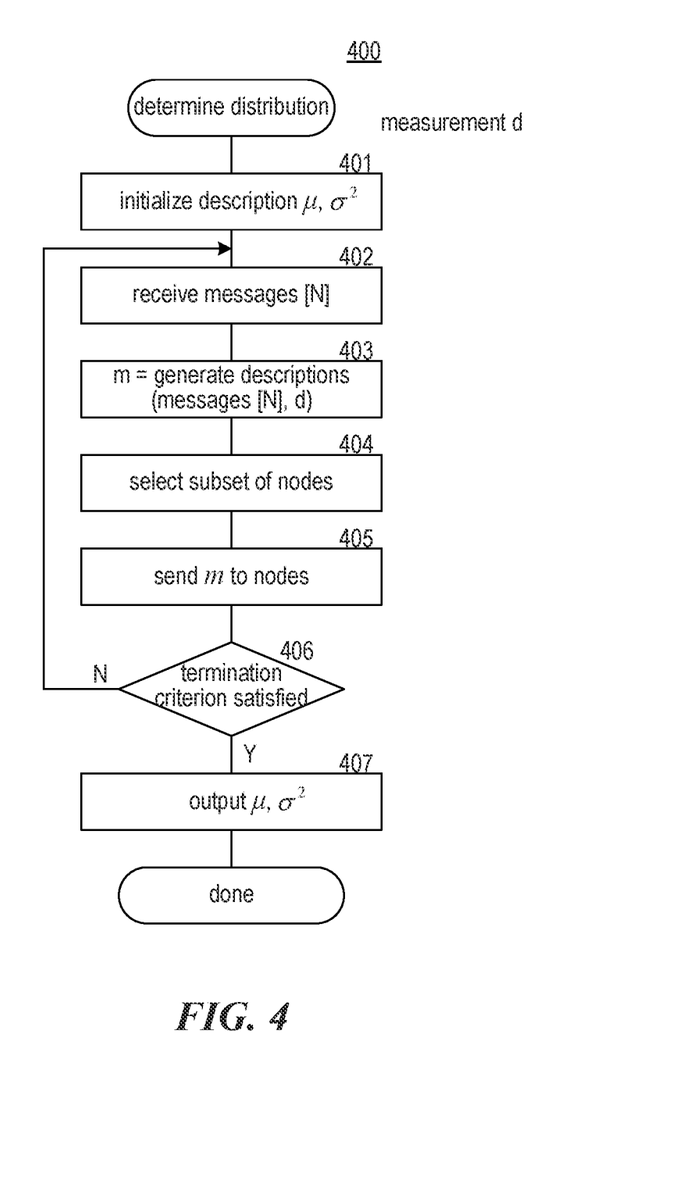
FIG. 4 is a flow diagram that illustrates the processing of the determine distribution component of the CID system in some embodiments.

FIG. 4 is a flow diagram that illustrates the processing of the determine distribution component of the CID system in some embodiments. The determine distribution component 400 is passed an indication of a measurement. In block 401, the component initializes a probability distribution description such as initializing the mean and variance of a Gaussian distribution. In block 402, the component receives messages from other nodes that include a probability distribution description and a gradient. In block 403, the component invokes a generate descriptions component passing an indication of the messages and the measurement and receives an indication of a message in return. The message includes a generated probability distribution description and a calculated gradient. In block 404, the component selects a subset of nodes. In block 405, the component sends the message to the selected subset of nodes. In decision block 406, if a termination criterion is satisfied, then the component continues at block 407, else the component loops to block 402 to perform the next iteration. In block 407 the component outputs an indication of the probability distribution description and completes.

Figure 5:
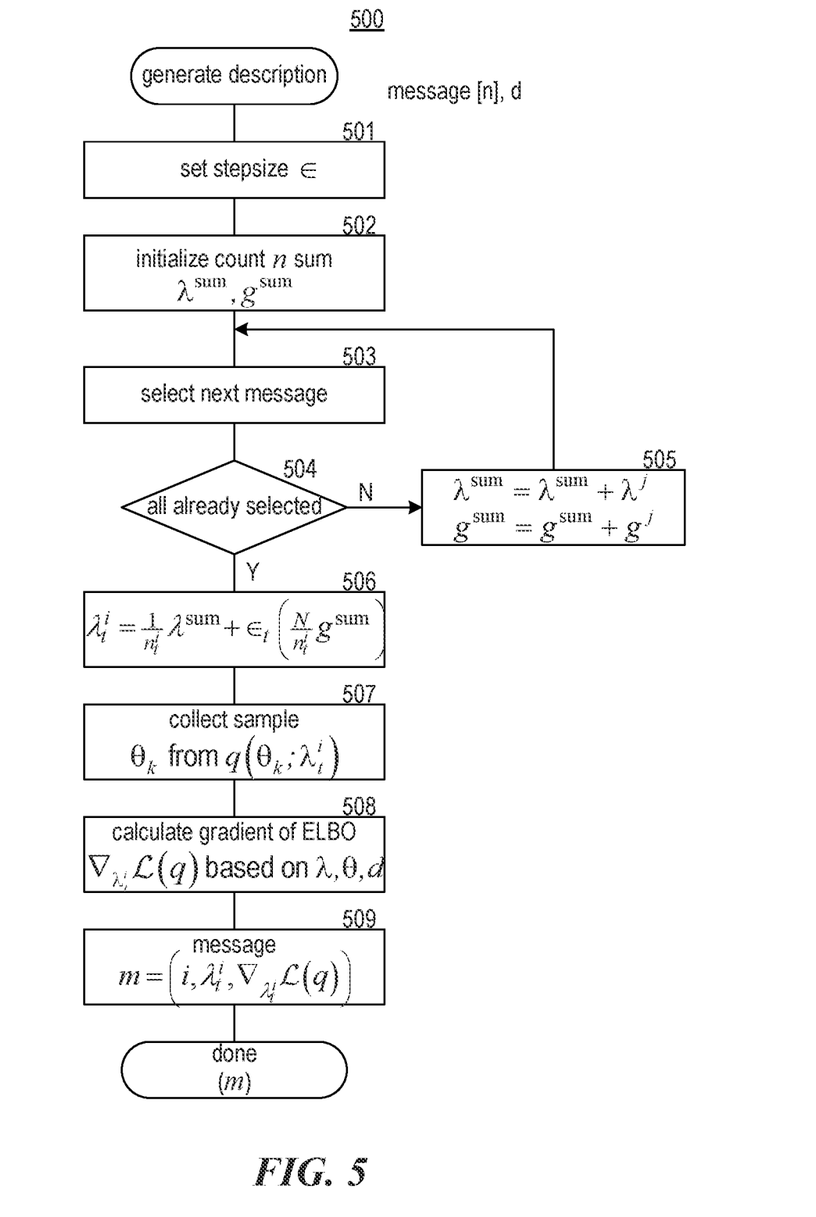
FIG. 5 is a flow diagram that illustrates the processing of the generate description component of the CID system in some embodiments.

FIG. 5 is a flow diagram that illustrates the processing of the generate description component of the CID system in some embodiments. The generate description component 500 is invoked to generate a probability distribution description and calculate a gradient. In block 501, the component sets a step size for weighting the gradient when generating a probability distribution description. In block 502, the component initializes a count of nodes, a summation of the variational parameters, and a summation of the gradients. In block 503, the component selects the next message starting with a first message. In decision block 504, if all messages have already been selected, then the component continues at block 506, else the component continues at block 505. In block 505, the component adds the variational parameters and the gradient of the selected message to the summation of the variational parameters and the summation of the gradients and loops to block 503 to select the next message. In block 506, the component generates the variational parameters based on the average of the sum of the parameters of plus a weighted portion of the gradient. In block 507, the component collects samples from the probability distribution represented by the variational parameters. In block 508, the component calculates a gradient based on the samples, the variational parameters, and the measurement. In block 509, the component creates a message indicating the variational parameters and the gradient and then completes.

The following paragraphs describe various embodiments of aspects of the CID system. An implementation of the CID system may employ any combination of the embodiments. The processing described below may be performed by a computing device with a processor that executes computer-executable instructions stored on a computer-readable storage medium that implements the CID system.

In some embodiments, a method performed by a node associated with a sensor and a computing device is provided for identifying a source location of a source of a physical quantity. The method collects via the sensor a measurement of the physical quantity. The method repeatedly re-calculates re-calculating parameters until termination criterion is satisfied as follows. For each of a plurality of other nodes, the method receives parameters and a gradient; the parameters repsents a probability distribution of the source location as determined by that node. The method generates parameters for the node based on the parameters and the gradients received from the other nodes. The method samples source locations from a distribution of source locations based on the generated parameters. The method calculates a gradient derived from the sampled source locations, the generated parameters, and a joint probability of the sampled source locations and the measurement. The method sends a subset of other nodes the generated parameters and the calculated gradient. When the termination criterion is satisfied, the generated parameters collectively represent the probability distribution of the source location. In some embodiments the physical quantity is a gas that is released at the source location. In some embodiments, the physical quantity is radiation that is released at the source location. In some embodiments, the probability distribution is a normal distribution and the parameters are mean and variance of the normal distribution. In some embodiments, the termination criterion is based on the calculated gradient. In some embodiments, the termination criterion is based on a number of iterations of re-calculating the parameters. In some embodiments, the calculating of the gradient is based on an Evidence Lower Bound relating to the probability distribution. In some embodiments, the repeatedly recalculating the parameters is based on a Black Box Variational Inference algorithm. In some embodiments, the method further determines whether the generated parameters and calculated gradient are informative and when not informative, suppresses the sending of the generated parameters and the calculated gradient. In some embodiments, the method further receives from a sensor an indication to forward the generated parameters and the calculated gradient to another node and forwarding the generated parameters and calculated gradient to the other node. In some embodiments, the method, prior to sending the generated parameters and calculated gradient to other nodes, quantizes the generated parameters, the calculated gradient, or both to reduce bandwidth needed for the sending. In some embodiments, the method further determines whether the generated parameters, the calculated gradient, or both are inconsistent with those received from other nodes, and when inconsistent, suppressing the sending of the generated parameters and the calculated gradient. In some embodiments, the method further, after the termination criterion is satisfied, determines a source location based on the generated parameters and outputting an indication of the determined source location. In some embodiments, the physical quantity is an acoustic a signal origination from the source location. In some embodiments, the physical quantity is an electromagnetic signal originating from the source location.

In some embodiments, a node is provided for identifying a characteristic of an event based on a measurement relating to the event and based on probability distribution descriptions received from other node. Each probability distribution description indicates a probability distribution of the characteristic. The node includes a sensor for collecting a measurement relating to the event, a communication component for communicating with other nodes, and a computing device. The computing device includes one or more computer-readable storage mediums for storing computer-executable instructions for controlling the computing device and one or more processors for executing the computer-executable instructions stored in the one or more computer-readable storage mediums. The instructions when executed receive via that communication component from each of a plurality of other nodes a probability distribution description and a gradient derived from samplings of the probability distributions by the other nodes. The instructions generate a probability distribution description based on the received probability distribution descriptions and gradients. The instructions sample values for the characteristic based on the generated probability distribution description. The instructions calculate a gradient derived from the sampled values, the generated probability distribution description, and a joint probability distribution of the sampled values and the measurement. The instructions send via the communication component to a subset of other node the generated probability distribution description and the calculated gradient. In some embodiments, the other nodes are a subset of nodes that are selected randomly. In some embodiments, the gradient is calculated based on a Black Box Variational Inference algorithm. In some embodiments, the instructions are executed repeatedly until a termination criterion is satisfied. In some embodiments, the termination criterion is based on the calculated gradient. In some embodiments, the termination criterion is based on a number of iterations of re-calculating the probability distribution description. In some embodiments, the instructions further when the termination criterion is satisfied, output a value for the characteristic derived from the generated probability distribution. In some embodiments, the probability distribution is a normal distribution and the probability distribution description includes mean and variance of the normal distribution. In some embodiments, the calculating of the gradient is based on an Evidence Lower Bound relating to the probability distribution. In some embodiments, the generation of the probability distribution description is based on a Black Box Variational Inference algorithm. In some embodiments. In some embodiments, the instructions further include instructions to determine whether the generated probability distribution description and calculated gradient are informative and when not informative, suppress the sending of the generated probability distribution description and the calculated gradient. In some embodiments, the instructions further include instructions to receive from a sensor an indication to forward the calculated gradient to another node and forward the generated probability distribution description and calculated gradient to the other node. In some embodiments, the instructions further include instructions to prior to sending the generated probability distribution description and calculated gradient to other nodes, quantize the generated probability distribution description, the calculated gradient, or both to reduce bandwidth needed for the sending. In some embodiments, the instructions to determine whether the generated probability distribution description, the calculated gradient, or both are inconsistent with those received from other nodes, and when inconsistent, suppress the sending of the generated probability distribution description and the calculated gradient. In some embodiments, the measurement is of an acoustic wave. In some embodiments, the measurement is of an electromagnetic wave.

In some embodiments, a network of nodes is provided for identifying value of a characteristic of an event based on a measurement of an output of the event and based on probability distribution information sent to and received from other nodes. The probability distribution information indicates a probability distribution of values of the characteristic. Each node includes a computing device that includes one or more computer-readable storage mediums for storing computer-executable instructions for controlling the computing device and one or more processors for executing the computer-executable instructions stored in the one or more computer-readable storage mediums. Until a termination criterion is satisfied, the instructions receive from other nodes a plurality probability distribution information. The instructions generate a combined probability distribution information based on the received probability distribution information. The instructions sample values for the characteristic based on the combined probability distribution information and the measurement; generating probability distribution information based on the sampled valued. The instructions send to other nodes the generated probability distribution information.

In some embodiments, a method performed by a node associated with a sensor and a computing device is provided for identifying a value of a characteristic of an event. The method collects via the sensor a measurement of the characteristic. The method repeatedly performs the following until termination criterion is satisfied. For each of a plurality of other nodes, the method receives information relating to a value for the characteristic. The information inclludes probability distribution information relating to a probability distribution of values for the characteristic as determined by that node. The method combines the information received from the other nodes to generate combined information that includes combined probability distribution information. The method samples values of the characteristic from a probability distribution based on the combined probability distribution information. The method calculates information for the node that includes calculated probability distribution information derived from the sampled values and the combined probability distribution information. The method sends to a subset of other nodes the calculated information. When the termination criterion is satisfied, the probability distribution of the combined information represents values of the characteristic of the event. In some embodiments, the probability distribution information includes a gradient of a log likelihood of a measurement of a node at a last value of a Markov chain of sample values and includes a sampled value. In some embodiments, the combining of the information includes calculating an average of the sample values and an average of the gradients of the log likelihood. In some embodiments, the method further calculates a gradient of a log likelihood of the measurement and a gradient of a log of the probability distribution previously calculated by the node. In some embodiments, the sampling of values is based on the gradient of the log of the probability distribution, the sampled values, and an average of the gradients of the log likelihood. In some embodiments, information received from another node includes parameters of the probability distribution and includes a gradient derived from sampled values, the parameters, and a joint probability of sampled values and a measurement. In some embodiments, the parameters are mean and variance of the probability distribution. In some embodiments, the combined information for the node is an average of the parameters and the gradients. In some embodiments, the event is selected from the group consisting of a release of a gas or radiation, transmission of an acoustic signal or an electromagnetic signal, or movement or positioning of an object. In some embodiments, the object is vehicle.

In some embodiments, a method performed by a computing system of a node in a network of nodes is provided for identifying a location of a source based on samples of data.

For each of a plurality of samples and for each of a plurality of iterations, the method performs the following. The method calculates a posterior probability of a source based on previous samples using a Markov chain Monte Carlo sampling. The method calculates a local estimate of the gradient of a loglikelihood based on a probability distribution derived from previous posterior samples. For each of a first set of first nodes, the method sends to that first node the calculated local estimate. For each of a second set of second nodes, the method receives from that second node a local estimate of the gradient of a loglikelihood based on previous posterior samples calculated at that second node. The method generates an estimated sample based on the calculated local estimate and the received local estimates. In some embodiments, the generating of the estimated sample is based on a fraction of a sum of the received local estimates. In some embodiments, the first set of first nodes is randomly selected for at least some of the iterations. In some embodiments, a received local estimate was calculated by a second node during a prior iteration.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method performed by a first node for identifying a source location of a potentially hazardous physical event, the method comprising:
collecting, via a sensor in the first node, a measurement of a physical quantity and is associated with the potentially hazardous physical event, wherein the first node is one of a plurality of nodes that are spatially distributed across a geographic area, each node of the plurality of nodes including a sensor and a computing device for identifying the source location of the potentially hazardous physical event, the computing device in each of the plurality of nodes including a processing unit and a memory;
repeatedly re-calculating parameters representing a probability distribution of the source location of the potentially hazardous physical event, by the computing device in the first node, until a termination criterion is satisfied, to iteratively increase an accuracy of an approximation of the source location of the potentially hazardous physical event, including,
receiving, from each other node of the plurality of nodes, a probability distribution description and a gradient, each said probability distribution description representing a probability distribution of the source location as determined by a corresponding other node, wherein each received probability distribution description is based on a model of measurements of the potentially hazardous physical event over time and space, the model including either of: i) a Black Box Variational Inference (BBVI) algorithm and an Evidence Lower Bound (ELBO), or ii) a Distributed Markov chain Monte Carlo ("MCMC") algorithm,
wherein, for a message routed through intermediate nodes, probability distribution descriptions and gradients generated by said intermediate nodes are integrated into the message to increase an amount of received data contributing to the approximation of the source location without increasing network communication overhead between the first node and each other node;
executing, by the first node, either of: i) a BBVI algorithm and an ELBO, or ii) a MCMC algorithm with an output of an additional probability distribution description as the approximation of the source location of the potentially hazardous physical event, based on the probability distribution descriptions received from the other nodes and the gradients received from the other nodes;
sampling the additional probability distribution description of the first node to produce a plurality of sampled probability distribution values of the probability distribution description generated by the first node;
calculating, by the first node, a gradient from the sampled probability distribution values of the probability distribution description generated by the first node, based on an ELBO relating to the probability distribution values;
sending, from the first node to a subset of the other nodes, the probability distribution description generated by the first node and the gradient calculated by the first node;
reducing propagation of unhelpful data to conserve network bandwidth in response to determining, based on a signal-to-noise ratio of the measurement or a magnitude of the calculated gradient, that the generated probability distribution description and calculated gradient are not informative;
filtering defective data in response to determining that the generated probability distribution description, the calculated gradient, or both are inconsistent with those received from other nodes; and
updating the parameters based on the probability distribution descriptions and gradients generated by said intermediate nodes,
wherein when the termination criterion is satisfied, the probability distribution generated by the first node is indicative of the approximation of the source location of the potentially hazardous physical event; and
outputting, by the first node, an indication of the approximation of the source location of the potentially hazardous physical event to an external entity.

2. The method of claim 1 wherein the physical quantity is a gas that is released at the source location.

3. The method of claim 1 wherein the physical quantity is radiation that is released at the source location.

4. The method of claim 1 wherein the probability distribution is a normal distribution and the parameters are mean and variance of the normal distribution.

5. The method of claim 1 wherein the termination criterion is based on the calculated gradient.

6. The method of claim 1 wherein the termination criterion is based on a number of iterations of re-calculating the parameters.

7. A node for identifying a source location of a potentially hazardous physical event based on a measurement relating to the potentially hazardous physical event and based on probability distribution descriptions received from other nodes, each probability distribution description indicating a probability distribution of the source location, the node comprising:
a sensor to collect a measurement of a physical quantity and is relating to the potentially hazardous physical event, wherein the sensor comprises at least one of a gas sensor or a radiation sensor and the potentially hazardous physical event comprises at least one of a gas release or a radiation release;
a communication component using which the node can communicate with other nodes; and
a computing device that includes:
one or more processors; and
one or more non-transitory computer-readable storage mediums storing computer-executable instructions, execution of which by the one or more processors causes the computing device to perform a process of iteratively increasing an accuracy of an approximation of the source location of the potentially hazardous physical event, wherein the process includes to:
receive via the communication component from each of a plurality of other nodes a probability distribution description and a gradient derived from samplings of the probability distributions by the other nodes, each node of the plurality of other nodes including a sensor and a computing device to identify the source location of the potentially hazardous physical event, the computing device in each of the plurality of other nodes including a processor and a memory, wherein each received probability distribution description is based on a model of measurements of the potentially hazardous physical event over time and space, the model including either of: i) a Black Box Variational Inference (BBVI) algorithm and an Evidence Lower Bound (ELBO), or ii) a Distributed Markov chain Monte Carlo ("MCMC") algorithm, wherein, for a message routed through intermediate nodes, probability distribution descriptions and gradients generated by said intermediate nodes are integrated into the message to increase an amount of received data contributing to the approximation of the source location without increasing network communication overhead between the node and each other node;
execute either of: i) a BBVI algorithm and an ELBO, or ii) a MCMC algorithm with an output of an additional another probability distribution description as the approximation of the source location of the potentially hazardous physical event, based on the received probability distribution descriptions and gradients, wherein the probability distribution description generated by the node is based on a model of measurements of the potentially hazardous physical event over time and space
sample the additional probability distribution description of the node to produce a plurality of sampled probability distribution values of the probability distribution description generated by the node;
calculate a gradient derived from the sampled probability distribution values of the probability distribution description generated by the node, based on an ELBO relating to the probability distribution values;
send via the communication component to a subset of the other nodes, the generated probability distribution description and the calculated gradient;
reduce propagation of unhelpful data to conserve network bandwidth in response to determining, based on a signal-to-noise ratio of the measurement or a magnitude of the calculated gradient, that the generated probability distribution description and calculated gradient are not informative;
filter defective data in response to determining that the generated probability distribution description, the calculated gradient, or both are inconsistent with those received from other nodes;
update the parameters based on the probability distribution descriptions and gradients generated by said intermediate nodes,
wherein when a termination criterion is satisfied, the generated probability distribution represents the approximation of the source location of the potentially hazardous physical event; and
output an indication of the approximation of the source location of the potentially hazardous physical event to an external entity.

8. The node of claim 7 wherein the other nodes are a subset of nodes that are selected randomly.

9. The node of claim 7 wherein the computer-executable instructions further include instructions to determine whether the generated probability distribution description and calculated gradient are informative and when not informative, suppress the sending of the generated probability distribution description and the calculated gradient.

10. The node of claim 7 wherein the computer-executable instructions further include instructions to receive from a sensor an indication to forward the calculated gradient to another node and forward the generated probability distribution description and calculated gradient to the other node.

11. The node of claim 7 wherein the computer-executable instructions further include instructions to, prior to sending the generated probability distribution description and calculated gradient to other nodes, quantize the generated probability distribution description, the calculated gradient, or both to reduce bandwidth needed for the sending.

12. The node of claim 7 wherein the computer-executable instructions to determine whether the generated probability distribution description, the calculated gradient, or both are inconsistent with those received from other nodes, and when inconsistent, suppress the sending of the generated probability distribution description and the calculated gradient.

13. The method of claim 1, further comprising randomly selecting the subset of the other nodes, to which to send the generated parameters and the calculated gradient.

14. The node of claim 7 wherein the node is at least one of an unmanned aerial vehicle ("UAV"), an unmanned ground vehicle ("UGV"), an unmanned underwater vehicle ("UUV") or an unmanned space vehicle ("USV").

* * * * *